United States Patent [19]

Rosenau

[11] Patent Number: 5,120,012

[45] Date of Patent: Jun. 9, 1992

[54] APPARATUS AND METHOD FOR DETACHABLY MOUNTING A SKATING DEVICE

[75] Inventor: Paul A. Rosenau, Santa Ana, Calif.

[73] Assignee: Circle Design Group, Orange, Calif.

[21] Appl. No.: 706,785

[22] Filed: May 29, 1991

[51] Int. Cl.⁵ .......................................... F16M 11/00
[52] U.S. Cl. .................................... 248/201; 211/89; 248/309.1
[58] Field of Search ............... 248/309.1, 205.2, 201, 248/310, 316.1, 316.7, 221.4; 211/89, 87; 280/841; 224/247; 294/163, 165

[56] References Cited

U.S. PATENT DOCUMENTS

| | | | |
|---|---|---|---|
| 2,353,809 | 7/1944 | Carson | 294/163 X |
| 2,460,903 | 2/1949 | Peck | 248/201 UX |
| 3,160,280 | 12/1964 | Burch | 211/89 |
| 3,404,785 | 10/1968 | Emary | 248/201 X |
| 3,627,248 | 12/1971 | Nelson | 248/309.1 |
| 3,861,697 | 1/1975 | Dolce | |
| 4,364,187 | 12/1982 | Melendez | |
| 4,878,585 | 11/1989 | Orestano | 248/205.2 X |
| 5,014,955 | 5/1991 | Thompson | 248/316.1 X |

FOREIGN PATENT DOCUMENTS

3016-602  11/1981  Fed. Rep. of Germany .
3335-229  11/1985  Fed. Rep. of Germany .
2027791   2/1980  United Kingdom ............... 248/201

Primary Examiner—J. Franklin Foss
Attorney, Agent, or Firm—Price, Gess & Ubell

[57] ABSTRACT

A skating device holding apparatus and method using resilient brackets affixed to a flat surface for detachably holding the skating device on the surface is provided. A pair of opposing, deflectable, wide brackets are spatially positioned on the flat surface. The brackets are positioned on the flat surface so that they extend parallel to axle assemblies axles affixed to the skating device. The fasteners are L-shaped with long sides affixed to the flat surface and short sides extending away from the flat surface at acute angles. The short sides are arcuate to aid the attaching and detaching of the skating device from the brackets. The short sides apply equal and opposite holding forces to the wheels for detachably retaining the wheels in the brackets. The surface can be a vertical surface, or any suitable mounting surface. The brackets may be affixed to the surface using any suitable affixing means.

19 Claims, 6 Drawing Sheets

APPARATUS AND METHOD FOR DETACHABLY MOUNTING A SKATING DEVICE

FIELD OF THE INVENTION

The subject invention relates generally to the suspension of sports articles and, more particularly, to an apparatus and method for detachably mounting an article, such as a skateboard or a pair of roller skates, on a flat surface.

BACKGROUND OF THE INVENTION

Various structures have been used to mount skating devices, such as skateboards and roller skates, onto a surface for storage. However, none of these structures provide both a stable attachment mechanism for the skating device and allow the attachment mechanism to be variable based upon the length or size of a skating device.

A mounting apparatus was shown in "Skateboarder Magazine" of May, 1978, Vol. 4, No. 10, sold by Merrick Skateboard Products Division of Mount Vernon, N.H. The Merrick apparatus appears to consist of a pair of hooks and a pair of clips that are attached to a bicycle rack for holding a skateboard on the bicycle rack. The clip is designed to fit around a single pair of wheels having a single diameter.

U.S. Pat. No. 4,878,585 discloses a nonrigid T-harness that may be affixed to a wall for hanging a surfboard or skateboard from the wall. The T-harness is made from a woven material and assembled from two pieces in a T-formation. Although the T-harness may be used with a number of different sized boards, the harness is unstable and allows the board to bang around.

Structures are also known which are clipped to and prevent roller skate wheels from rotating when they are used for walking. Examples are disclosed in U.S. Pat. Nos. 4,364,187 and 3,861,697 and German Patent No. DE301602. In a similar fashion, German Patent No. DE3335299 discloses a device that may be attached to the wheels of a skateboard to enable running of the skateboard on ice or snow. However, none of these devices provides a skateboard holding method and device which is simply applied to a surface, allows easy mounting and detachability of skateboards, provides a secure and stable mounting mechanism, and will fit a number of skateboards having varying sizes.

OBJECTS OF THE INVENTION

It is therefore an object of the invention to provide a skating device holding apparatus and method that securely holds a skating device in place and to which the skating device can be attached to, and detached from, with ease.

It is a further object of the invention to provide a skating device holding apparatus and method which can be easily applied to a surface and securely and stably holds the skating device when mounted;

It is yet another object of the invention to provide a skating device holding apparatus and method capable of holding various skating devices having varying sizes and dimensions; and It is yet still another object of the invention to provide a skating device holding apparatus and method that is stable, easily applied to different surfaces, and prevents marring of those surfaces.

SUMMARY OF THE INVENTION

These and other objects of the present invention are achieved by providing a skating device holding apparatus and method.

In one application, the invention consists of resilient fasteners which may be fixed to a mounting surface at varying spatial distances, the distances being coordinated to holdably accept a particular skateboard or roller skate having its own dimensions. Thus, the resilient fasteners are customized to the desired skating device when they are fixed within a single mounting plane. The skating device may then be easily attached and detached in a single clipping motion.

In the preferred embodiment, the skating device holder uses a pair of opposing, deflectable, substantially wide brackets spatially positioned on a mounting surface. The brackets are positioned in a mounting plane so that they extend parallel to axle assemblies on the skating device.

The brackets used in the preferred embodiment have elongated sides which may be affixed to the flat surface. Short sides extend away from the flat surface at an acute angle to resiliently accept the skating device's wheels. The brackets are positioned on the flat surface with a desired distance between them so that the short sides apply equal and opposite holding forces to the pairs of wheels for detachably retaining the wheels in the brackets.

The mounting surface can be a vertical surface, such as the wall of a building, a horizontal surface, such as a shelf, or any suitable surface. The mounting surface may itself be nonplanar as long as the brackets may be fixed in a single mounting plane. The brackets may be attached to the surface using suitable affixing means, such as adhesive tape, glue, or screws, or combinations of various affixing means.

BRIEF DESCRIPTION OF THE DRAWINGS

The present invention, both as to its organization and manner of operation, together with further objects and advantages, may be understood by reference to the following drawings.

DESCRIPTION OF THE PREFERRED EMBODIMENTS

The following description is provided to enable any person skilled in the art to make and use the invention and sets forth the best modes presently contemplated by the inventor for carrying out his invention. Various modifications, however, will remain readily apparent to those skilled in these arts, since the generic principles of the present invention have been defined.

Figure 1:
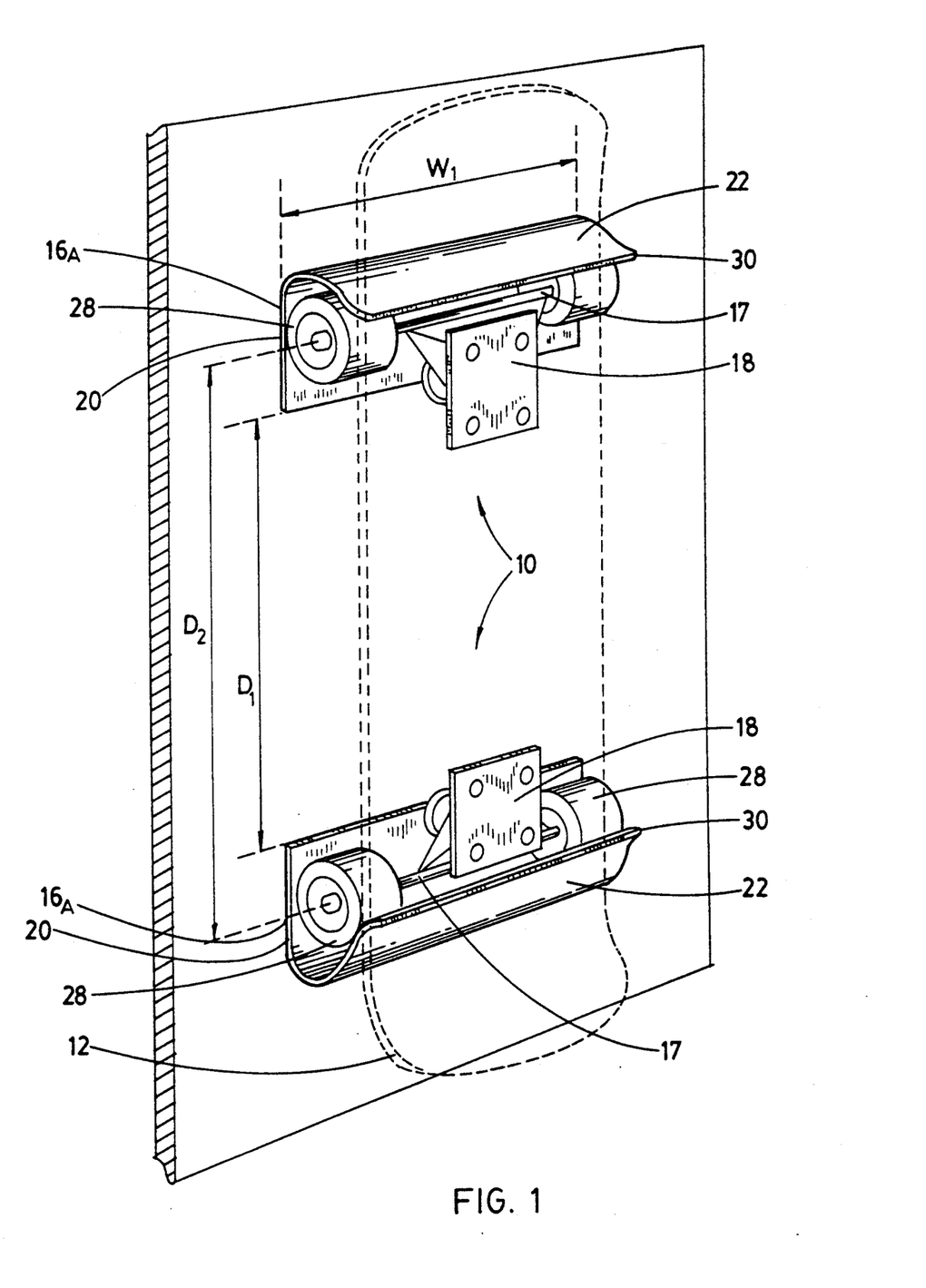
FIG. 1 is a perspective view showing a skateboard detachably held on a flat vertical surface by the preferred embodiment of the present invention.
Figure 3:
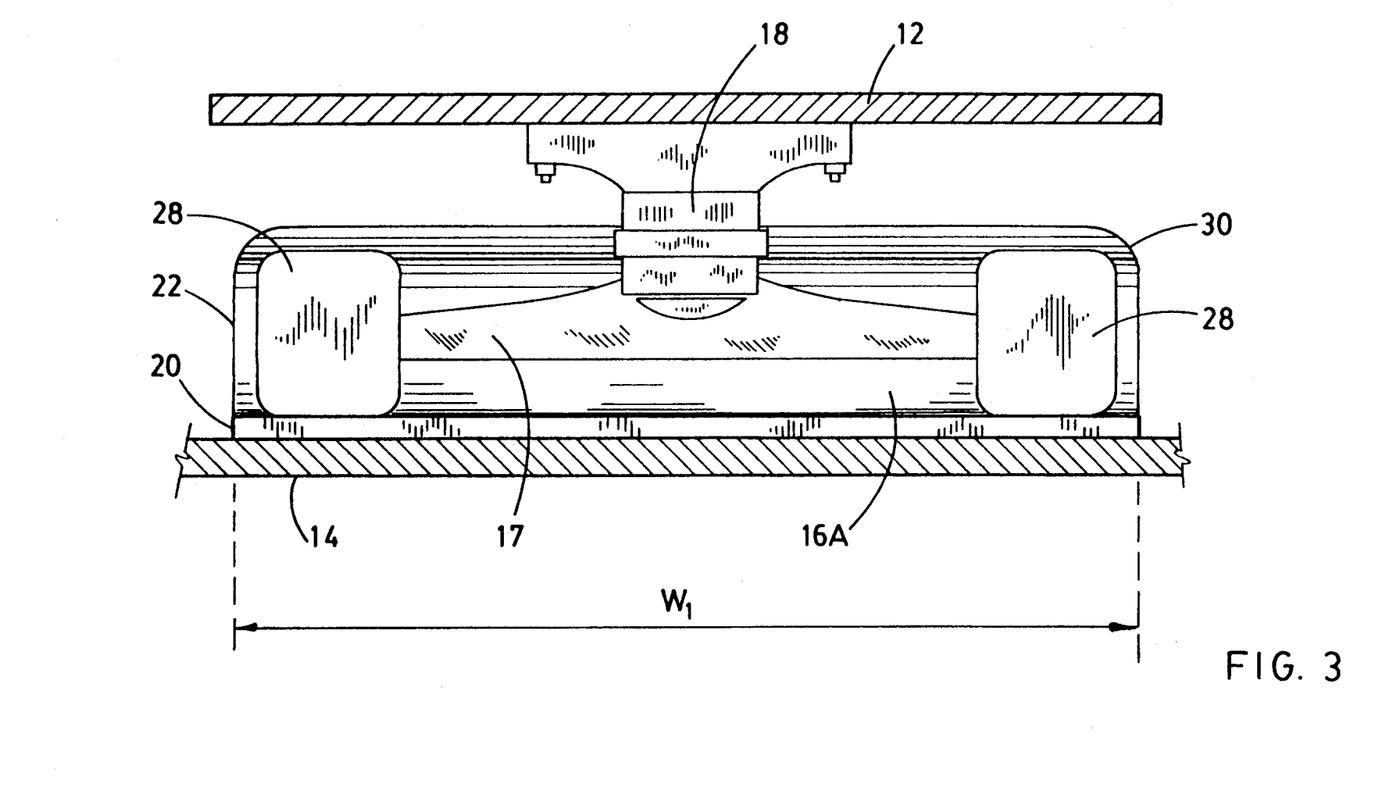
FIG. 3 is a plan view of a preferred embodiment of the present invention.

Referring to FIGS. 1 and 3, there is shown a skating device holding apparatus 10 constructed according to the principles of the present invention. In this preferred embodiment, a skateboard 12 is detachably held in a single mounting plane on a mounting surface 14 by the holding apparatus 10. The holding apparatus 10 can hold a skating device, such as the skateboard 12, on any mounting surface such as a vertical wall 14 of a building. The preferred embodiment 10 includes a pair of wide, resilient brackets 16A that are affixed to the wall 14 parallel to one another.

The resilient brackets 16A are applied to the mounting surface 14 by the user. The user coordinates the placement of the brackets 16A in a single mounting plane according to the particular skateboard 12 to be mounted. A distance $D_1$ between the brackets 16A is determined by a distance $D_2$ between axle assemblies 18 on the skating device 12. The overall length of the skating device 12 may determine the distance $D_2$ between the axle assemblies 18. A width $W_1$ of the brackets 16A may be manufactured to be dependent upon various lengths of axles 17 of the skateboard 12. The width of the brackets 16A should be greater than the length of the axles 17, as measured from the exterior periphery of wheels 28 mounted to the axle 17. This will add to the ease of attaching and detaching the skateboard 12 from the brackets 16A. When used to mount skateboards 12, the width $W_1$ is approximately 10 inches.

In the preferred embodiment, the brackets 16A include flat elongated sides 20 and short arcuate sides 22 that extend away from the long sides 20 at an acute angle. The short sides 22 have curved ends 30 to help deflect the short sides 22 away from the long sides 20.

The brackets 16A may be made of any suitable resilient material, such as ABS plastic, and formed using vacuum forming, injection, or extrusion-type molding. The brackets 16A of the holding apparatus 10 may be affixed to the wall 14 using various affixing means, such as two-sided adhesive tape 24, or screws 26. Holes 36 may be disposed through the bracket's long side 20 to mount the brackets 16A using screws 26.

Figure 2:
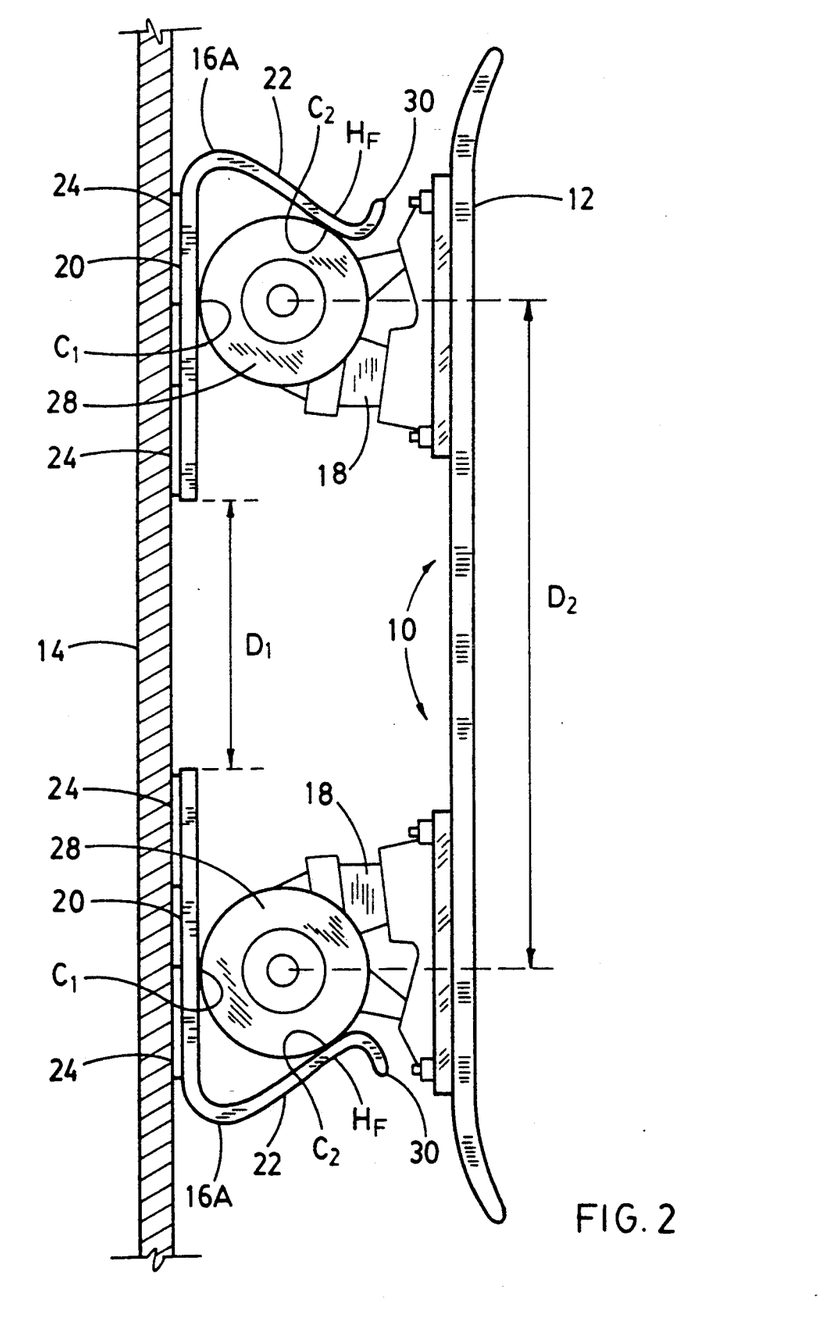
FIG. 2 is a side view of the preferred embodiment of the present invention.

Referring now to FIG. 2, the apparatus 10 is shown holding the skateboard 12 on the wall 14. The skateboard is attached to the holding apparatus 10 by first inserting an axle assembly 18 into one of the brackets 16A until the wheels 28 contact the bracket's long side 20. The wheels 28 are then pressed against the short side 22 with enough force to deflect it slightly away from the long side 20. The remaining axle assembly 18 is then rotated towards the remaining bracket 16A.

As the axle assembly's wheel 28 makes contact with the short side's curved end 30, the wheel 28 will deflect the arcuate short side 22 away from the long side 20. Once the end 30 of the short side 22 passes beyond the diameter of the wheel 28, the resiliency of the bracket 16A causes the short side 22 to exert a holding force $H_F$ on the wheel 28 that presses the wheel 28 against the long side 20. Each short side 22 exerts a holding force $H_F$ equal and opposite to the holding force $H_F$ applied by the short side 22 of the opposing bracket 16A for holding the skateboard's wheels 28 within the brackets 16A.

When the wheels 28 are retained by the brackets 16A of the preferred embodiment, a first portion of the wheel's circumference $C_1$ makes contact with the bracket's long side 20, and a second portion of the wheel's circumference $C_2$ simultaneously contacts the bracket's short side 22. The second portion of the wheel's circumference $C_2$ contacts the bracket's short side 22 less than 180 degrees and more than 90 degrees from the position where the first portion of the wheel's circumference $C_1$ contacts the bracket's long side 20, as measured around the circumference of the wheel 28. Thus, the equal and opposite holding forces $H_F$ applied by the bracket's short side 22 press the wheels 28 against the long sides 20 of the brackets 16A to detachably hold the skateboard 12 on the wall 14.

Figure 4A:
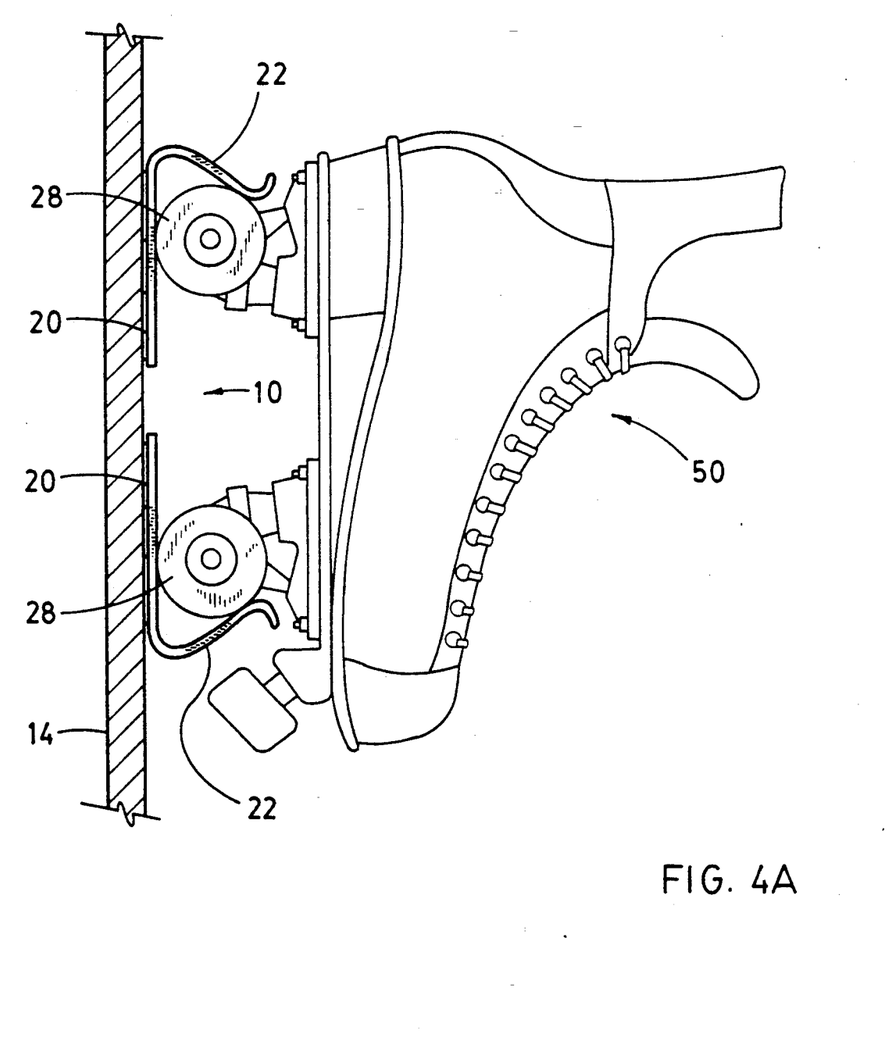
FIGS. 4A and 4B are side views showing different configurations of roller skates detachably held on a flat vertical surface by the preferred embodiment of the present invention.
Figure 4B:
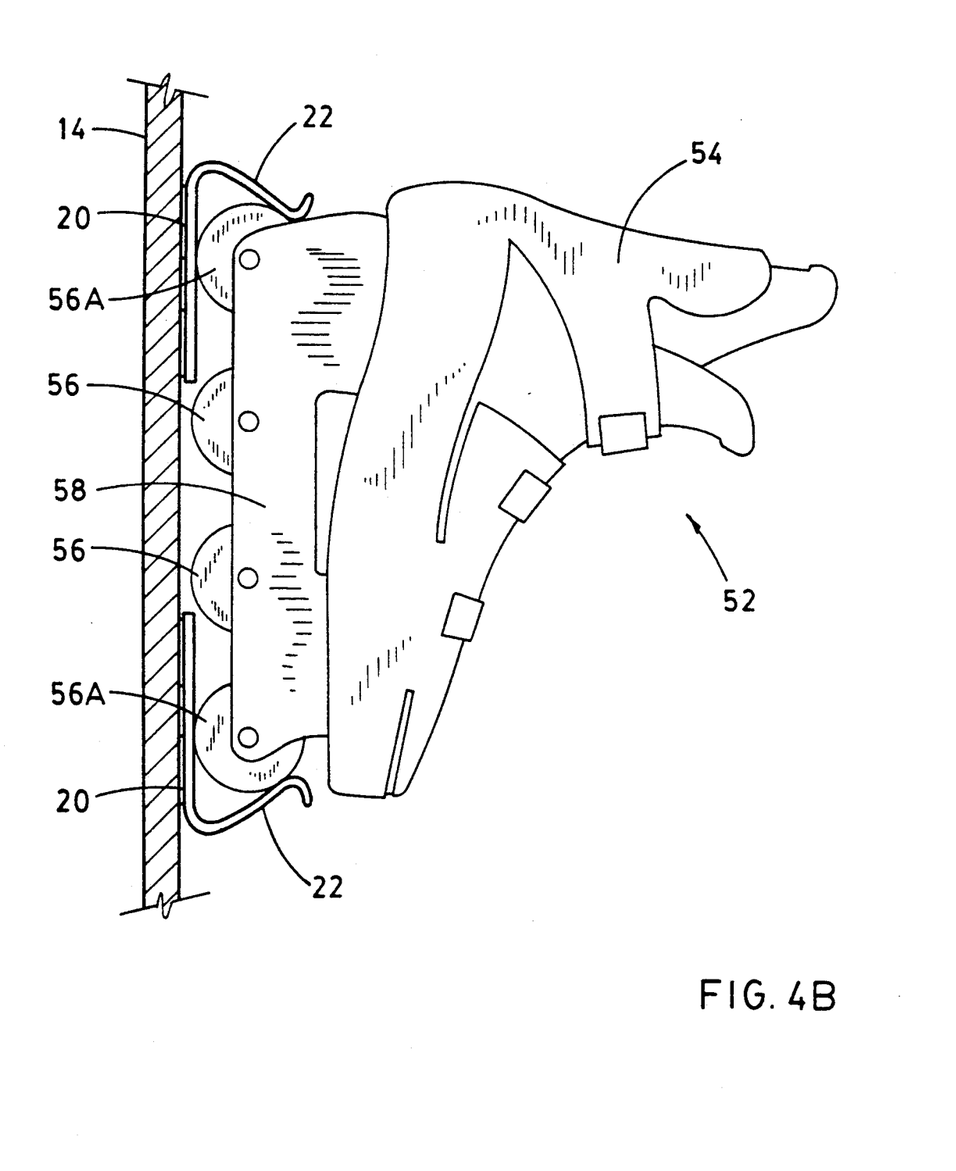

FIG. 4A shows a conventional roller skate 50 detachably held by the preferred embodiment of the holding apparatus 10, while FIG. 4B shows a popular alternative 52 to the conventional roller skate 50 being held by the holding apparatus 10. The alternative roller skate 52 is sold under the trademark "Rollerblades," by Rollerblade, Inc. of Eden Prairie, Minn.

The Rollerblade skate 52 consists of a rigid plastic shoe 54 having a series of wheels 56 rotatably held in a linear relationship in an elongated housing 58 that extends the length of the shoe 54. The "in-line" arrangement of the Rollerblade's wheels 56 is similar to the straight blade of a conventional ice skate (not shown).

The conventional roller skate 50 and Rollerblade 52 may be placed in the holding apparatus 10 using the steps described for inserting a skateboard 12 into the apparatus 10. A pair of Rollerblade roller skates 52 may be placed in the brackets 16A substantially close to one another, to prevent the Rollerblades from skewing in the brackets 16A. However, when properly mounted, the brackets 16A will provide sufficient friction when the wheels 57 are in place to prevent a sidewise slippage. A frictional layer (not shown) can also be provided around the brackets 16A to provide increased friction force. This layer can be commonly known "friction tape," as discussed below.

Figure 5:
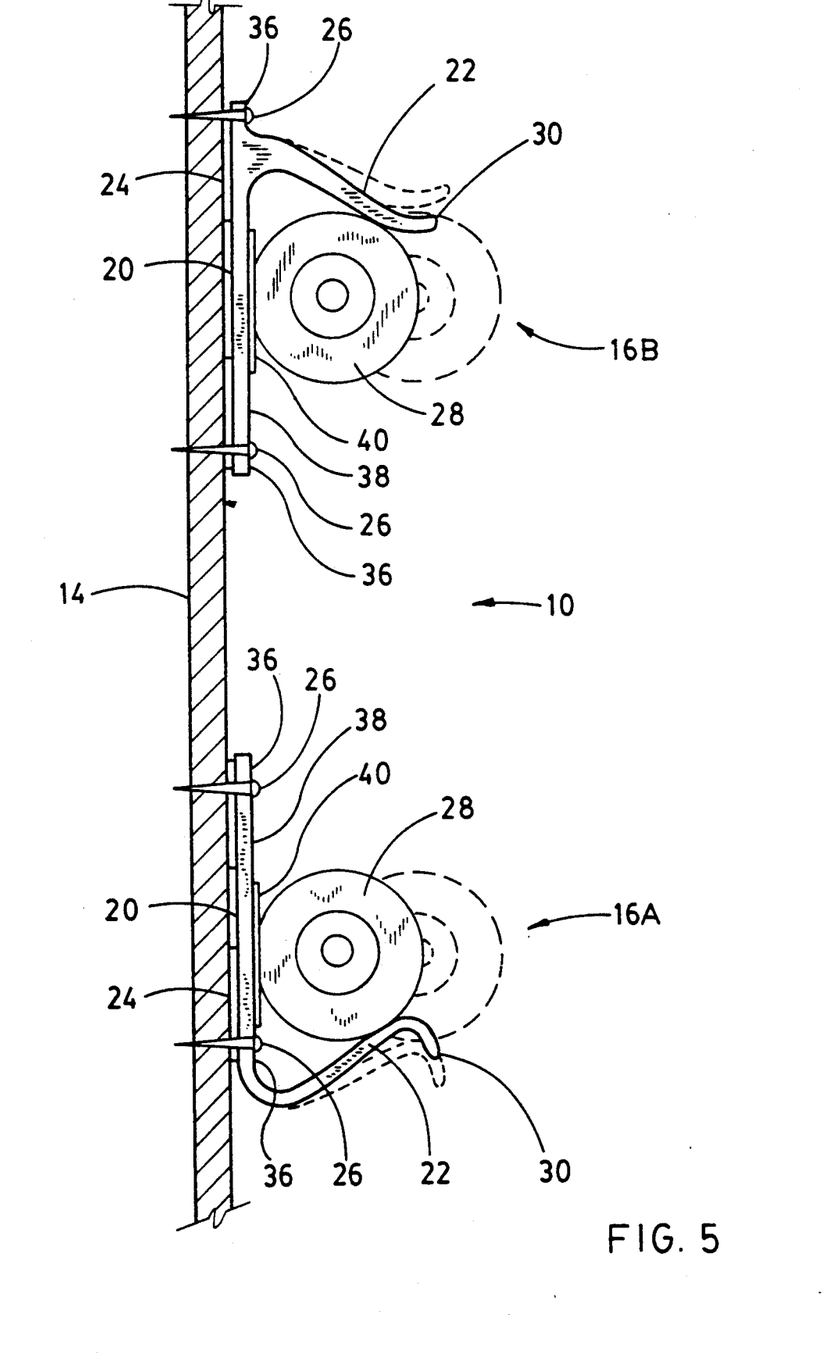
FIG. 5 is a side view showing an alternative embodiment and the preferred embodiment of the present invention.

FIG. 5 shows a bracket 16A that is formed using extrusion-type molding and a bracket 16B formed using vacuum molding. The holes 36 may be disposed through the long side 20 of the brackets 16A, 16B at different locations, depending on the fabrication technique of the brackets 16A, 16B.

An exterior surface 38 of the bracket's long side 20 may be covered with a frictional coating 40 to frictionally engage the skateboard's or roller skate's wheels 28 or Rollerblades wheels 56. The coating may be a tape with a coarse or rough outer surface which will create friction between the wheel 28, 56 and the long side's surface 38.

The skateboard 12, roller skate 50, or Rollerblade 52 may be removed from the holding apparatus 10 by pulling on the skating device 12, roller skate 50, or Rollerblade 52 with a force greater than the holding force $H_F$, and at an angle perpendicular to the wall 14 or other planar surface the holding apparatus 10 may be affixed to. The skateboard 12, roller skate 50, or Rollerblade 52 may also be removed from the holding apparatus 10 by pulling on an end of the skating device 12, 50, 52 close to a desired axle assembly 18, or end wheel 56A of the Rollerblade 52, at an angle approximately perpendicular to the holding force $H_F$ exerted on the wheel 28, 56 by the short side 22 and exerting a force greater than the holding force $H_F$. The remaining wheels 28, or wheel 56A, are easily dislodged from the remaining bracket 16A.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A skating device mount, comprising:
   (a) a mounting surface; and
   (b) a mounting member attached to the mounting surface for detachably mounting the skating device within a single mounting plane of attachment, wherein the mounting member includes a pair of opposing resilient fasteners spatially positioned on the mounting surface within the plane of attachment for detachably retaining the skating device within the plane of attachment, and wherein said pair of fasteners include brackets having arcuate ends extending away from the plane of attachment, each bracket applying a holding force to a first wheel equal and opposite to a holding force applied to a second wheel by the opposing bracket, each bracket simultaneously contacting a first portion of a circumference of at least one wheel of the skating device and a second portion of the circumference of the at least one wheel less than 180 degrees from said first portion when the skating device is retained by the apparatus.

2. The skating device mount of claim 1 wherein said brackets are affixed to the mounting surface using screws.

3. The skating device mount of claim 1 wherein said brackets are adhered to the mounting surface using a tape having an adhesive on both sides.

4. The skating device mount of claim 1 wherein said brackets comprise resilient plastic.

5. The skating device mount of claim 4 wherein said brackets comprise ABS plastic.

6. The skating device mount of claim 5 wherein the mounting surface is a vertical wall of a building.

7. An apparatus for detachably retaining a body member having at least one wheel affixed to a first end and at least one wheel affixed to a second end, said device comprising:
   resilient means spatially positioned on a mounting surface for detachably retaining said body member in said plane of attachment, wherein said resilient means comprise a pair of opposing deflectable fastener means spatially positioned in said plane of attachment, such that each of said fastener means applies a holding force to said wheel affixed to said first end of said body member equal and opposite to a holding force applied to said wheel affixed to said second end of said body member by the opposing fastener means for retaining said body member in said plane of attachment.

8. The apparatus of claim 7 wherein said pair of fastener means comprise substantially wide L-shaped brackets having elongated sides affixed to said mounting surface with short sides extending away from said plane of attachment at an acute angle thereto, said brackets simultaneously contacting a first portion of a circumference of each of said wheels, and a second portion of the circumference of each of said wheels less than 180 degrees and more than 90 degrees from said first portion of the circumference of said wheels when said body member is detachably retained by said device.

9. The apparatus of claim 8 wherein the short sides of said L-shaped brackets are an arcuate configuration.

10. The apparatus of claim 9 wherein said brackets are affixed to said mounting surface using screws.

11. The apparatus of claim 9 wherein said brackets are adhered to said mounting surface using an adhesive tape having adhesive on both sides.

12. The apparatus of claim 11 wherein said brackets comprise resilient ABS plastic.

13. The apparatus of claim 12 wherein an adhesive coating is disposed on adjacent sides of said L-shaped brackets for frictionally adhering said wheels to said brackets.

14. The apparatus of claim 13 wherein said mounting surface is a vertical wall of a building.

15. An apparatus for detachably holding a skating device having at least two wheels attached to axle assemblies, comprising:
   a pair of opposing elongated deflectable bracket members spatially positioned on a plane of attachment for detachably retaining said skating device in said plane of attachment, said brackets being substantially L-shaped and extending substantially parallel to the axle assemblies affixed to said devices, said brackets having arcuate ends that extend away from said plane of attachment at an acute angle, said bracket members simultaneously contacting a first portion of a circumference of each of said wheels and a second portion of the circumference of each of said wheels less than 180 degrees and more than 90 degrees from said first portion of the circumference of said wheels when said skating device is detachably retained by said holding apparatus, an arcuate end of one of said brackets applying a holding force to said wheels equal and opposite to a holding force applied to said wheels attached to a second axle assembly by the arcuate end of said opposing bracket member for detachably retaining said skating device in said plane of attachment.

16. The holding apparatus of claim 15 wherein said bracket members are substantially greater in width than said axle assemblies.

17. The holding apparatus of claim 16 wherein said bracket members comprise injection molded resilient plastic.

18. A method of mounting a skating device clipping assembly, comprising the steps of:
   locating a mounting surface;
   placing a first resilient bracket on the mounting surface;
   locating a position on a mounting surface for a second opposing resilient bracket to be placed such that the first and second brackets are spatially positioned in a single mounting plane of attachment and with a distance between the first and second brackets determined by wheel position on a skating device to be held by the assembly;
   placing the second bracket on the mounting surface at the desired location substantially parallel to the first bracket; and
   coupling the first and second brackets to the mounting surfaces.

19. A method of mounting a skating device with at least two axle assemblies to a holding device positioned in a mounting plane of attachment on a mounting surface, comprising the steps of:
   inserting a first axle assembly having at least one wheel into a first resilient bracket until the wheel contacts a long side of the bracket;

pressing the wheel against an arcuate short side of the bracket with substantial force for deflecting the short side slightly away from the long side;

rotating a second axle assembly having at least one wheel towards a second, opposing resilient bracket;

pressing the wheel of the second axle assembly against an arcuate short side of the second bracket for deflecting a curved end of the short side away from a long side of the second bracket until a diameter of each of the wheels passes beyond the curved end of the short side and the resiliency of the first and second brackets causes the short sides to exert a force on the wheels for pressing the wheels against the long sides for holding the axle assemblies' wheels within the brackets for mounting the skating device in the mounting plane.

* * * * *